April 2, 1946.  V. BUSH ET AL  2,397,467
APPARATUS FOR GENERATING CONTINUOUSLY VARIABLE MECHANICAL OPERATIONS
Filed Sept. 5, 1940
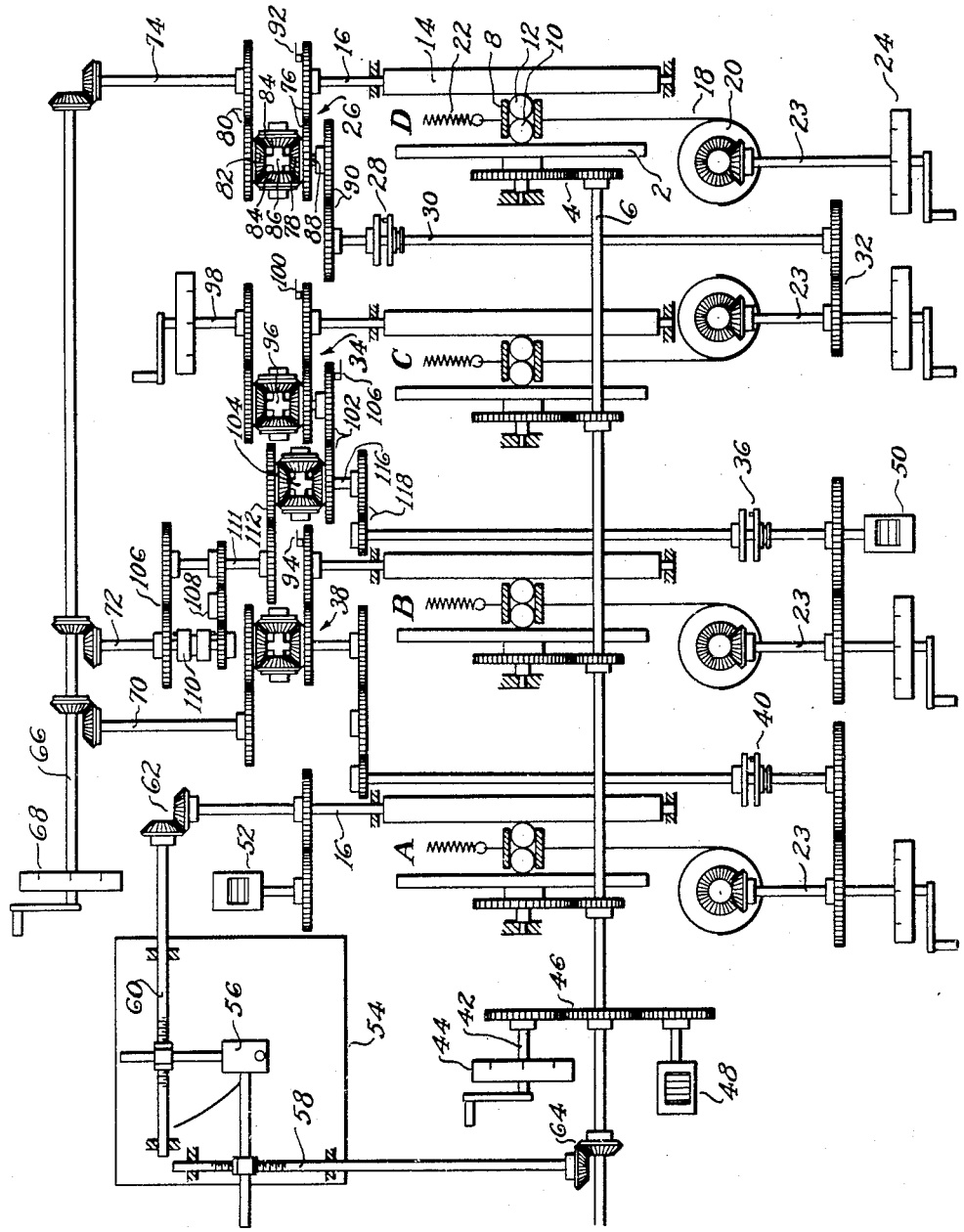

Patented Apr. 2, 1946

2,397,467

UNITED STATES PATENT OFFICE 2,397,467

APPARATUS FOR GENERATING CONTINUOUSLY VARIABLE MECHANICAL OPERATIONS

Vannevar Bush, Jaffrey, N. H., and Samuel H. Caldwell, Belmont, Mass., assignors to Research Corporation, New York, N. Y., a corporation of New York Application September 5, 1940, Serial No. 355,486

8 Claims. (Cl. 33—18)

The present invention relates to methods and apparatus for generating continuously variable mechanical operations in accordance with a given mathematical function.

The purpose of the invention may first be explained by considering the problem of plotting a curve from given experimental data. The data are usually in tabular form, exhibiting a value of the dependent variable (or function) $y$ for each value of the independent variable (or argument) $x$. According to usual methods, the coordinates $(x, y)$ are plotted on a sheet and then an attempt is made to draw a smooth curve through all the points by means of a suitable template, French curve or similar device. Actually, the result is a succession of short curves, the joining of which depends on the skill of the draftsman. It is practically impossible to avoid abrupt changes of slope and curvature in the resulting graph. Moreover, the plot will not in general accurately represent the function in the intervals between the plotted points.

A similar problem is presented in any attempt to draw an accurate curve of an analytically expressed function. To make a graph of the function $y=e^x$, for example, it is first necessary to compute values of $y$ for a number of values of $x$. The computed data are arranged in tabular form, and from that point on the difficulties of drawing the curve are the same as in the case of experimentally obtained data. The only difference is that a large number of values may be computed so that the intervals between plotted points may be made very small, but while this may diminish the error in interpolated values, it only increases the labor of the draftsman and does not avoid the presence of objectionable discontinuities in slope and curvature.

Such problems of curve drawing are important in the operation of apparatus for mathematical analysis, an example of which is the differential analyzer described in a paper by V. Bush published in the Journal of the Franklin Institute of October, 1931. Apparatus of this type which is designed particularly for accurate solution of involved differential equations, requires that the input functions be accurately represented. The value of the apparatus for analysis of involved equations may be seriously limited if a plotted curve is not truly representative of the function, or if it exhibits appreciable discontinuities in the function and its derivatives.

Similar problems are presented in many industrial operations. For example, in the manufacture of objects of irregular shape such as dies, cams, propellers, etc., the machine tools cannot, by existing methods, be made to perform the desired operations (except by the use of templates or models, the manufacture of which presents the same problem).

According to the present invention the mechanical apparatus to be operated, whether a curve drawing instrument or a machine tool, is controlled in a smooth and continuous manner from the available data. The data obtained from whatever source, whether analytical, experimental or empirical, are arranged in tabular form with any intervals of independent variable. From these data are computed the first, second, and higher order difference values, preferably to the fourth order, in a manner to be hereinafter explained. A multiple mechanical integration is then carried out on the computed difference values by a series of integrators arranged in cascade, the constants of integration being determined by appropriate integrator settings in accordance with the difference values of lower order. The output of the final integrator is a generated function, which is continuous, which is equal to the given function at the points determined by the original data, and which is representative of the given function at all other points with a high degree of accuracy. The output of the final integrator is connected to the mechanical unit which is to be operated in accordance with the generated function.

The invention contemplates the use of mechanism for automatically correcting any deviation of the generated data from the given data. Such deviations arise from two causes: first, mathematical errors due largely to the use of differences or difference ratios instead of derivatives and, second, unavoidable errors, both random and systematic, in the operation of the apparatus itself. It is essential that the generated function should correspond within close limits to values of the given function at the ends of the intervals. If, through any cause, the generated data at the end of an interval deviate from the true values for the beginning of the next interval, corrections based on the magnitudes of such deviations are applied to the integrators in the next succeeding interval. The deviation from the true value is always negligible and the purpose of the correcting devices is to prevent accumulation of errors in succeeding intervals. The apparatus thus continually corrects itself and eliminates errors before they can assume more than negligible values.

The accompanying drawing is a diagrammatic view of apparatus embodying the features of the present invention.

General description and theory

The invention will be described as embodied in a curve-drawing device to plot a continuous curve from a set of tabulated data. By way of example, the following data may be considered:

| x | y |
|---|---|
| 0.7 | 2.01375 |
| 0.8 | 2.22554 |
| 0.9 | 2.45960 |
| 1.0 | 2.71828 |
| 1.1 | 3.00417 |
| 1.2 | 3.32012 |
| 1.3 | 3.66930 |
| 1.4 | 4.05520 |
| 1.5 | 4.48169 |
| 1.6 | 4.95303 |
| 1.7 | 5.47395 |

This tabulation will be recognized as the function $y=e^x$ from $x=0.7$ to $x=1.7$, but the nature and origin of the data are immaterial. According to ordinary methods, the co-ordinates $(x, y)$ would be plotted for the several values of $x$ and an attempt would then be made to draw a smooth curve through those points.

A first approximation to the curve would be given by drawing a series of straight lines connecting the points. The equations of these lines would differ for the different intervals but are mathematically expressible by the following equation: $y_i=a_i+b_ix$ where the subscript $i$ designates the values of the function and the coefficients for the $i$th interval. The coefficients have constant values within any interval but their values differ for different intervals, being determined by the necessity of having the graph pass through the beginning and end points of each interval. The plot thus obtained would not be satisfactory because although the plotted function would be continuous, the first and all higher derivatives would be discontinuous.

A better approximation would be obtained if parabolas of the form $y_i=a_i+b_ix+c_ix^2$ could be drawn through the points. Since another coefficient is now available, it is theoretically possible not only to make the curve pass through the plotted points, but also to attach another condition, namely, that the first derivative should be continuous at the points where the parabolas join, so that no abrupt changes of slope would be exhibited.

Closer approximations might be obtained by adding terms of higher degree in the independent variable. For example, the function might be represented by a succession of fourth degree polynomials of the following type:

$$y_i=a_i+b_ix+c_ix^2+d_ix^3+e_ix^4 \quad (1)$$

Under such conditions, if the coefficients were properly chosen, the resulting plot would pass through the desired points and would exhibit no discontinuities in the first three derivatives. But even if the coefficients could be accurately computed for each interval, it would be impossible by ordinary methods to draw the graph with any approach to accuracy.

The problem to which the present invention is addressed is to provide a mechanical apparatus and method by which a series of curves of the form (1) may be automatically drawn for the several intervals and properly connected in such a way as to give a smooth, continuous plot representative of the true function. It should be emphasized at this point that the invention does not seek to evaluate the coefficients, that is, its object is not to determine an empirical equation from the given data.

Before describing the construction and operation of the apparatus a further explanation of the theoretical principles will be given. If Equation 1 above is differentiated four times the following result is obtained:

$$\frac{d^4y}{dx^4}=24e_i \quad (2)$$

Conversely, if Equation 2 is integrated four times and the proper constants of integration are supplied, Equation 1 will be obtained. The invention makes use of this fact. From the tabulated data are computed the first, second, third and fourth order differences in the usual manner. The fourth difference (or difference ratio as will be defined later) is then integrated through four integrators arranged in cascade with the constants of integration introduced by initially setting the integrators to values determined by the initial values of the computed differences. This approach assumes as a first approximation that the differences are equivalent to the corresponding derivatives of the function. This assumption is not strictly correct because the derivatives are continuous, whereas the differences are step functions. However, it has been found that by carrying the differences to a sufficiently high order, preferably the fourth, a result of sufficient accuracy may be obtained, particularly since the correcting mechanism may be constructed to remove any appreciable inaccuracies due to this preliminary assumption.

Referring now to the specific problem given by way of example, namely, the plotting of a continuous function represented by the data given above, the first step is to compute by any suitable method the differences of the first, second, third and fourth order. The values of $x$ and $y$ and the differences of the first four orders are given below:

| x | y | $\delta y$ | $\delta^2 y$ | $\delta^3 y$ | $\delta^4 y$ |
|---|---|---|---|---|---|
| 0.7 | 2.01375 | | | | |
| | | 0.21179 | | | |
| 0.8 | 2.22554 | | 0.02227 | | |
| | | 0.23406 | | 0.00235 | |
| 0.9 | 2.45960 | | 0.02462 | | 0.00024 |
| | | 0.25868 | | 0.00259 | |
| 1.0 | 2.71828 | | 0.02721 | | 0.00026 |
| | | 0.28589 | | 0.00285 | |
| 1.1 | 3.00417 | | 0.03006 | | 0.00032 |
| | | 0.31595 | | 0.00317 | |
| 1.2 | 3.32012 | | 0.03323 | | 0.00032 |
| | | 0.34918 | | 0.00349 | |
| 1.3 | 3.66930 | | 0.03672 | | 0.00038 |
| | | 0.38590 | | 0.00387 | |
| 1.4 | 4.05520 | | 0.04059 | | 0.00039 |
| | | 0.42649 | | 0.00426 | |
| 1.5 | 4.48169 | | 0.04485 | | 0.00047 |
| | | 0.47134 | | 0.00473 | |
| 1.6 | 4.95303 | | 0.04958 | | |
| | | 0.52092 | | | |
| 1.7 | 5.47395 | | | | |

The formation of this table is in accordance with the ordinary rules, whereby any entry in any difference column is the difference between the preceding and succeeding entries in the preceding column. The irregularity in $\delta^4 y$ is due to the "rounding off" of the last place in the values of the function; somewhat greater accuracy would be obtained by carrying the work to one more place and then rounding off the several values individually.

A quadruple mechanical integration of the step function $\delta^4 y$ is now to be carried out for each of the successive intervals while suitably fixing the constants of integration. At this point it is to be noted that while the differences themselves as shown by the table, may be used, it is more convenient to work with specific differences or difference ratios. If $h$ is the length of the interval between successive values of $x$ (in this case $h=0.1$), the first difference ratio is $\delta y$ divided by $h$, the second difference ratio is $\delta^2 y$ divided by $h^2$, etc. The difference ratios thus obtained correspond to the derivatives of the function, whereas the differences correspond to the differentials. In the following description, the difference ratios will be used, but their values are not tabulated since they can be obtained easily from the above table by simply dividing by the proper power of $h$.

The mechanical apparatus for accomplishing this result will now be described. The apparatus comprises four integrators A, B, C and D, each of the general type described in the patent to Ford 1,317,915, dated October 7, 1919. Each integrator comprises a disk 2 driven through gearing 4 by a shaft 6. The shaft is common to all the integrators and is termed the argument shaft. Adjacent to the disk of each integrator is a carriage 8 enclosing two steel balls 10 and 12. The ball 10 is in frictional engagement with the disk and is rotated thereby except when it is at the exact center of the disk. The ball 10 rotates the ball 12 by frictional engagement and the latter rotates a roller 14, having an output shaft 16. The carriage 8 may be moved in a path parallel to the axis of the output shaft, preferably by means of a steel tape 18 connected at one end to the carriage and at the other end to a disk 20, the tape being maintained under tension by any suitable take-up means indicated as a spring 22 connected with the carriage. The disk 20 of each integrator may be set, as indicated in the drawing, by a manually operated shaft having a graduated dial 24.

If the displacement of the carriage from the center of the disk is designated by $s$, an incremental rotation $\Delta \alpha$ of the disk will cause the output shaft to be rotated by an amount proportional to $s\Delta \alpha$. Over any interval the number of turns of the output shaft is proportional to the integral of the carriage displacement. Therefore, if the carriage is moved so that its displacement varies in accordance with some function, the number of turns of the output shaft from its initial position will at any instant represent the integral of the function.

The input to the fourth integrator D, which is introduced manually at 24, is a step function determined by the fourth order difference ratio of the tabulated data. The output of the fourth integrator is fed to the input of the third integrator C. This is accomplished by connecting the output shaft 16 of the fourth integrator through a gear train 26 and clutch 28 with a shaft 30 which is connected through spur gears 32 with the input shaft 23 of integrator C. The gear train 26 is provided for the purpose of introducing corrections, as will be described in detail hereinafter. Similarly, the output of integrator C is connected to the input of integrator B through a gear train 34 and a clutch 36, and the output of integrator B is fed to the input of integrator A through a gear train 38 and a clutch 40, which will also be described in detail later.

The argument shaft 6 is rotated by any suitable means indicated as a manually operated shaft 42 provided with a dial 44. The shaft 42 is connected to the argument shaft through gears 46. A revolution counter 48 indicates the accumulated number of revolutions of the argument shaft.

The displacement of the second integrator B and the output of the first integrator A are indicated by revolution counters 50 and 52, respectively. The output of the first integrator A is connected to a mechanical device operated in accordance with the function generated by the apparatus. As herein shown the mechanical device is a curve-drawing instrument 54 having a pen carrier 56 operated by lead screws 58 and 60. The lead screw 60, which determines the ordinates of the plotted function, is driven through bevel gears 62 from the output shaft 16 of integrator A. The lead screw 58, which determines the abscissae, is driven through gears 64 from the argument shaft 6.

From the foregoing description it will be seen that the integrators are connected in cascade, whereby a fourth order integration is performed on the function introduced into the fourth integrator D.

The remaining parts shown in the drawing but not described above are provided for the purpose of introducing corrections, a description of which will be deferred until after the operation of the parts previously described has been explained.

To illustrate the manner of operating the mechanism reference may again be made to the above example of tabulated data. The carriages of the several integrators are given initial displacements determined by the corresponding tabulated difference ratios. In establishing these initial settings it is necessary to take account of several matters, as follows:

1. The tabulated values of the differences necessarily diminish in number in the process of computation, and the table contains fewer values for the several differences than for the function. Accordingly, only the tabulated values corresponding to values of $x$ between 0.9 and 1.5 will be considered, and the values lying outside this range may be viewed only as a means of computing the difference values within the desired range. In any case it is possible to obtain by extrapolation such values as may be necessary for effecting the required operation of the apparatus.

2. While the values of the function and even order differences apply to the ends of the intervals, the differences of odd order, namely, the first and third, apply to the midpoints of the intervals. For these odd-order differences the averages between successive tabulated values will be used.

3. Account must be taken of the relation of the integrator constants to the scales of the variables. For the present it may be assumed that the integrator constants are such as to handle the data presented by this particular problem, but in other cases, it may be necessary to reduce the data by scale factors, in a manner obvious to those skilled in mechanical computation.

For the first interval the carriage of the fourth integrator D is therefore given an initial displacement of 2.4 units, which is the fourth order difference ratio, namely, the first tabulated value of the fourth order difference divided by $$h^4=0.0001$$

The third integrator C is given an initial displacement of 2.47 units (the average of 0.00236 and 0.00259 divided by $h^3$). The second integrator B is given an initial displacement of 2.462 units (0.02462 divided by $h^2$), and the first integrator A is given a displacement of 2.4637 units, which is the average of the adjacent values 0.23406 and 0.25868 divided by $h$. These initial settings are made with the clutches 28, 36 and 40 open. The clutches are then closed, and the argument shaft is rotated a certain number of revolutions, depending on the integrator constants, representing a change in the variable $x$ through a unit interval, namely, from 0.9 to 1.0.

Before proceeding further the equations involved in the operations of the several integrators may be given. If $D_4$ is the initial displacement of the carriage of the fourth integrator from its neutral position, then the output of that integrator after $x$ units of rotation of the argument shaft is proportional to $D_4x$, since the displacement is not varied in the interval. For the third integrator the displacement after $x$ units of rotation of its shaft is given by the equation $$s_3 = D_3 + D_4x$$

In this equation $D_3$ is the initial setting of integrator C and $D_4x$ is a term introduced by the fact that the output shaft of integrator D is coupled to the carriage of integrator C. Mathematically, $D_3$ is a constant of integration, the value of which is fixed by the initial setting of the third integrator.

The output of the third integrator is determined by integrating the last equation above. This output is coupled to the second integrator B, the constant of integration being fixed by the initial displacement of integrator B, namely, $D_2$. The instantaneous displacement of the carriage of integrator B is therefore given by the equation $$s_2 = D_2 + D_3x + D_4\frac{x^2}{2}$$

Similarly, the first integrator which is given an initial displacement $D_1$ has an instantaneous displacement $$s_1 = D_1 + D_2x + D_3\frac{x^2}{2} + D_4\frac{x^3}{6}$$

Finally, the output of the first integrator is $$y = D_0 + D_1x + D_2\frac{x^2}{2} + D_3\frac{x^3}{6} + D_4\frac{x^4}{24} \quad (3)$$

where $D_0$ is a constant of integration and, in fact, is equal to the tabulated value of $y$ at the beginning of the interval. This equation is of the same form as (1), except the coefficients are now determined from the integrator settings, which in turn depend on the tabulated difference values.

In the example assumed above, $D_4 = 2.4$, $D_3 = 2.47$, $D_2 = 2.462$, and $D_1 = 2.4637$. The constant $D_0 = 2.45960$ and is accounted for by the initial setting of the curve drawing instrument. It is therefore only necessary to set these initial displacements and rotate the argument shafts of the integrators. With these settings the integrators are only operated through a single interval, that is, the disks are rotated through $h$ units, thereby bringing $x$ to the value 1.0 at the end of the interval. At the end of the interval the several integrators will have undergone displacements, the values of which may be determined by substituting $h$ for $x$ in the several equations above. Likewise, the generated value of $y$ will be determined by substituting $h$ for $x$ in the last equation. This generated value of $y$ is represented by the number of turns of the output shaft of the first integrator and also by the motion of the curve drawing instrument.

If the method of analysis herein described were rigorously correct, and if the various mechanisms performed their functions without error of any kind, the generated value of $y$ represented by the above equation and appearing as the output of the first integrator would correspond exactly with the tabulated value of $y$ at $x = 1.0$, namely, 2.71828. Even aside from mechanical errors it cannot be expected that the generated value and the true value will agree perfectly because of the mathematical errors introduced by assuming the several difference ratios to be equivalent to the derivatives of corresponding orders and by neglecting differences beyond the fourth order. The approximation is so close that the deviation in any interval may be completely neglected, but it must be compensated in succeeding intervals in order that errors may not be allowed to accumulate. The method and apparatus for compensating the errors will be described subsequently.

When the original function is expressed analytically its successive derivatives may be computed and the settings of the integrators may be made in accordance with the numerical values of such derivatives at the beginning of each interval. This method avoids the first of the foregoing mathematical errors since Equation 3 then becomes a Taylor's series, which is exact except for the neglect of all terms beyond the fourth. The use of derivatives rather than differences or difference ratios therefore offers a theoretical advantage of slightly greater accuracy when the original function is expressed analytically, but any slight advantage may be offset by the labor of computing the derivatives, particularly since corrections must be ordinarily applied in any event to account for the other errors; furthermore, the derivative method cannot be used with empirical or experimental data. But it is apparent that the invention is equally applicable to the use of differences, difference ratios, and derivatives, all of which are comprehended by the general term "difference values" used herein.

The foregoing description carries the integration only through the first interval. Prior to the integration of the second interval corrections are to be applied. Before describing the method and apparatus for introducing corrections, mention will first be made of a condition which will not in general arise in practice, namely, that the positions of the integrator output shafts at the end of the first interval agree with the values of the tabulated data for the beginning of the second interval, indicating that the operations have been exact and that no corrections are necessary. In such a case it is only necessary to set the fourth integrator to the second tabulated value, namely 2.3 units, and then rotate the argument shafts of the integrators the proper amounts to carry them through the second interval. These operations are repeated for each new interval, the only necessary adjustment being the resetting of the displacement of the fourth integrator carriage, so long as no deviations appear in the generated data.

In the ideal case just described where no deviations appear, the generated function in each interval is a fourth degree polynomial. The coefficients vary from interval to interval but always assume such values that the successive increments join to plot a continuous function which is also continuous in the first three derivatives. The curve drawn by the instrument not only agrees with the given function at the tabulated values thereof, but accurately represents the function at points within the intervals; stated more rigorously, it approximates the given function by a fourth degree polynomial within each interval. Actually the approximation is extremely close.

Although the invention has been described as utilizing difference values to the fourth order, it will be understood that the differences may be carried to any order desired, either higher or lower than the fourth. The number of integrators employed will be equal to the highest difference order which is utilized. It has, however, been found preferable to work to the fourth order. While difference values to the third, or even second, order might be sufficient for some purposes, the gain in accuracy and stability appears to justify the use of fourth order differences. On the other hand, to carry the work to higher orders than the fourth does not appear to justify the additional complication.

*Correction procedure*

The invention has been described thus far on the assumption that the generated data agree with the given data at the end of each interval so that it is only necessary to introduce the tabulated values of the fourth order difference ratios for the succeeding intervals. In general, for reasons heretofore given, deviations between the generated and given data will inevitably appear. These deviations in any interval are extremely small and would not need to be accounted for except that they must not be permitted to accumulate. According to the present invention the apparatus is corrected at the beginning of each new interval for the purpose of preventing accumulation of the errors.

It will be evident that if deviations appear it is not sufficient merely to set the integrator carriages to the new tabulated difference values at the beginning of each interval, because this would not remove errors which cause the generated function to drift from the given function. It would also be necessary to set the function to its given value at the beginning of each interval. The objection to this procedure is that it introduces discontinuities into the function.

According to one method the integrator carriages are first set to the values of the given data at the beginning of the new interval, and then prior to the integration of the new interval, the first three integrator carriages are subjected to correction displacements or offsets computed from the deviations of the generated function from the given function. Before describing the method of determining the offsets it may first be noted that it is unnecessary to set all of the integrators to the tabulated difference values. Actually, in the preferred method, it has been found sufficient to set the carriages of only the second and fourth integrators to the new values of the second and fourth difference ratios, respectively. The first and third integrators would require a further calculation because of the fact that the tabulated difference values apply to the mid-points of the intervals. It has been found that this additional effort is unnecessary and that the first and third integrators may be allowed to float; that is to say, it is unnecessary to set their carriages to the tabulated values of the first and third differences except at the beginning of the first interval.

Referring to the numerical example heretofore given, let it be assumed that at the end of the first interval when $x=1.0$ the generated value of the function $y$ differs from its true value of 2.71828 and the output of the second integrator differs from the true second order difference ratio of 2.721. It is for the purpose of comparing these generated values with the true values, that the revolution counters 50 and 52 are provided. These counters indicate the displacement of the second integrator B and the output of the first integrator A, respectively, and are sufficiently accurate to indicate the number of revolutions and fractions thereof to the same number of significant figures as the tabulated values. At the beginning of the second interval the carriage of the second integrator is set by means of its shaft 23 to its proper value of 2.721, and the carriage of the fourth integrator is set by its shaft 23 to the value of 2.6. After these preliminary settings the corrections are now to be applied to the carriages of the first, second and third integrators.

The method of correction is theoretically analyzed as follows: The given function has the successive values $y_0$, $y_1$, $y_2$, etc. If the integration were carried out over all intervals, but without the application of any corrections, the generated function, as read on the counter 52, would exhibit the successive values $y_0$, $y_1+p_1$, $y_2+p_2$, $y_3+p_3$, etc. The values $p_1$, $p_2$, $p_3$, etc. form what may be termed an error function or deviation function $p(x)$. If the values of $p(x)$ were known, its successive differences $\delta p(x)$, $\delta^2 p(x)$, etc., could be tabulated exactly as in the case of the given function. Hence, it would be only necessary to compensate the difference ratios of the given function in accordance with the tabulated difference values of the error function. That is to say, at the beginning of any interval, the first integrator carriage would be subjected to an offset of $$\frac{-\delta p}{h}$$

the second integrator carriage to an offset of $$\frac{-\delta^2 p}{h^2}$$

and the third to an offset of $$\frac{-\delta^3 p}{h^3}$$

In any case, of course, scale factors and integrator constants would be accounted for, as previously mentioned.

In practice, the error function is not known at the start, but the values which develop as the generating operation proceeds are used. The output counter is read at the end of each interval, and the value of $p$ is computed by comparison thereof with the given function. The difference ratios of the deviation function to the third order are computed from this and preceding values of $p$, and these difference ratios are introduced as correction offsets to the first three integrator carriages in the manner indicated above. As in the case of the given function, the assumption of equivalency of difference ratios and derivatives is a source of residual error; another slight residual error appears because the corrections are introduced in intervals subsequent to those in which the deviations develop. However, the residual errors for any interval merely enter into the deviation for the next interval, and are automatically accounted for in the next succeeding correction.

This method therefore ties down the operation of the apparatus to the values of the given function for each interval, but without introducing any discontinuities into the function itself. While some residual deviations appear in the generated function, they cannot accumulate.

The method described above is theoretically the best method yet devised for introducing corrections, but it has the disadvantage of being cumbersome in that the deviations must be noted and their difference values up to the third order must be computed. It has been found that a satisfactory correction system using the measured deviations directly rather than difference values of the deviations can be used. Consider the first interval of generation in which the function starts with the value $y_0$ with zero deviation and is to proceed to the value $y_1$. If the measured deviation at the end of the first interval is $p_1$, instead of applying to the first integrator an offset of the theoretical amount $$\frac{-p_1}{h}$$

at the beginning of the second interval, an offset of twice that amount is applied. At the same time an offset is applied to the second integrator so that during the second interval it removes all of the offset initially applied to the first integrator. Since the first integrator starts with an offset double that theoretically required and ends with a zero offset, the average offset during the interval is equal to that theoretically required. The first integrator carriage is thus brought to its proper position at the end of the second interval, except for errors that may have been introduced during the second interval. Also any possible effect of the deviation $p_1$ on intervals subsequent to the second has been removed. At the end of the second interval, the deviation $p_2$ is measured and applied to the integrators prior to the third interval of generation, and so on. This procedure is satisfactory for the correction of mathematical errors (i. e., those due to substitution of difference ratios for derivatives of the given function), but it must be modified to take care of mechanical errors.

The necessary modifications are based on the assumption that certain types of errors, if they occur within any interval, will tend to persist in the next interval. An additional correction is therefore applied to the first integrator to anticipate a repetition of the error, and also to introduce a tendency to reverse the sign of the deviation in the next interval. These effects are produced not only by increasing the offset of the first integrator, but also by decreasing the counteracting offset of the second integrator.

Since, as previously noted, the second integrator is set to the correct tabulated value prior to the application of the offset thereto, any errors due to the third and fourth integrators are inappreciable. A correction offset proportional to the deviation is, however, applied to the third integrator in such a direction as to remove during the generated interval a part of the offset applied to the second integrator. This has been found desirable, mainly for the purpose of resisting any tendency of the system toward instability. If, because of any systematic errors, there is any tendency toward a unidirectional drift, the accumulation of offsets on the third integrator affects the second integrator in a way to turn the curvature of the generated function more sharply in the direction to oppose the drift. At the same time the setting of the second integrator to the tabulated value at the beginning of each interval prevents the third integrator from causing large amplitudes of deviation.

Since the third integrator floats, its net offset at any time is proportional to the algebraic sum of the offsets previously applied. In other words, the net offset of the third integrator tends to follow the integral of the error and the direction of the correcting effort is always such as to reduce the integrated error. This is important since it is desirable that the integrated error, that is, the average error over the whole generated function, shall tend toward zero.

Because of the fact that the relative magnitudes of the mathematical, systematic, and accidental errors cannot be anticipated, the determination of the amount of offset according to the foregoing principles must be largely empirical. After extensive experimentation with various test functions it has been found that if the deviation at the end of any interval is $p$, the preferred offsets to be applied to the first three integrators are such as to produce the following deviations in the output, each considered as acting separately:

Due to first integrator_____ $-2.8p$
Due to second integrator_____ $+0.72p$
Due to third integrator_____ $-0.18p$ These numerical values ignore scale factors, integrator constants and interval lengths, and hence do not represent actual offsets, but rather the changes in output which would be produced by each of these offsets acting separately. Thus, the actual offset for the first integrator is one such that if maintained throughout the interval would by itself change the output by the amount $-2.8p$ during the interval. With the correction factors specified above, the net result of the interaction of the elements of the correction system is to cause a 226% correction of each measured deviation, which is the figure derived by taking the algebraic sum of the several contributions. This total correction may be regarded as involving, first, 100% to correct the indicated deviation; second, an additional 100% to prevent a repetition of the same deviation; and, third, an over-correction of 26%, so that the direction of any deviation will tend to reverse during the interval, and thus to reduce the average error. It will be understood that the foregoing numerical values are those which have been found by experiment to be most satisfactory, but that they may be varied within wide limits, so long as the general principles of the correction procedure are followed.

One more consideration must be taken into account under a condition that sometimes arises in practice, namely, the matter of applying corrections when the argument is changing in the negative direction. This condition does not ordinarily arise in plotting the function $e^x$ because the plot can be made with the argument always increasing in the positive direction. But if, for example, a magnetic hysteresis loop is to be plotted, the operations can be performed continuously by plotting one set of $y$-values against an increasing argument ($h$ positive) and the other set against a decreasing argument ($h$ negative).

Mechanically, this is accomplished simply by rotating the argument shaft in one direction for positive $h$ and in the opposite direction for negative $h$. The offset coefficients given above are for positive values of $h$. If $h$ is negative, it can be shown theoretically that the same coefficients are used, except that the coefficient for the second integrator offset is negative. Thus the offsets to the first three integrators for a decreasing argument are $-2.8p$, $-0.72p$ and $-0.18p$, respectively.

The present invention includes mechanical devices by which the correction offsets may be simultaneously introduced without the necessity of individually operating the setting devices 23 of the first three integrators. To this end there is provided a correction shaft 66 having a dial 68 with graduations to indicate the magnitude of the offsets to be introduced. Offset shafts 70, 72 and 74 for offsetting the carriages of the first, second and third integrators, respectively, are connected by bevel gears with the correction shaft.

For the offset to the third integrator the shaft 74 leads into the gearing which has been previously designated generally at 26, but which will now be described in detail. The output shaft 16 of the fourth integrator is connected through spur gears 76 with a driving gear 78 of a differential motion. The offset shaft 74 is connected through spur gears 80 with the other driving gear 82 of the differential. The driven gears 84 of the differential are journaled on a spider 86 having a shaft 88 connected through spur gears 90 with the shaft 30 which, as previously described, is connected through the gears 32 with the setting shaft 23 of the third integrator. A brake 92 shown as operated against one of the gears 76, is used to hold the output shaft of the fourth integrator stationary while the correction offset is applied to the third integrator through the differential. A brake might also be used in conjunction with the correction shaft 66 to hold the latter stationary during integration, but is usually unnecessary because the integrator operations cannot be transmitted back through the gearing associated with the correction mechanism.

The gearing 38 whereby the carriage of the first integrator is controlled either from the output of the second integrator or from the offset shaft 70, is substantially identical to that just described for the third integrator, as may be seen from the drawing, and need not be described in detail. A brake 94 is provided to restrain the output shaft of the second integrator while the correction offset is applied to the first integrator carriage through the differential.

For the second integrator the mechanism includes means for setting the integrator carriage to its tabulated value and also for introducing correction offsets from the shaft 72, and for the latter provision is made for changing the sign of the offset to take care of either positive or negative values of $h$. To these ends the gearing 34 comprises a train similar to the gearing 26, including a differential 96. Motions may be introduced through the differential by means of a manual setting shaft 98 which is for the purpose of bringing the carriage to its tabulated value at the beginning of the interval. A brake 100 is provided to restrain the output shaft of the third integrator. The driven member of the differential 96 is connected through spur gears 102 with one driving gear of a differential 104. One of the gears 102 is provided with a brake 106. The offset shaft 72 is connected with the other driving gear of the differential through either a reversing train 108 or a non-reversing train 108 selectively controlled by a clutch 110, a shaft 111 and spur gears 112. When the argument is changing in the positive direction the clutch 110 is connected to introduce the offset through, say, the train 108, and when the argument is changing in the negative direction the clutch 110 is then set for engagement with the train 106. (It is apparent that neither direction of rotation of any particular shaft is uniquely or inherently positive or negative. For any given machine it is merely necessary to establish consistent relative directions of rotation throughout.) The driven member of the differential 104 is connected by a shaft 116 with gearing 118 which leads to the setting shaft 23 of the second integrator as heretofore described.

The various gear ratios are such as to apply corrections of proper magnitudes to the several integrators in accordance with the offset coefficients previously noted herein. The correction shaft 66 is turned at the beginning of each interval by an amount proportional to $p$, which is the deviation of the generated value of the function (as indicated by the counter 52) from the tabulated value. Since the corrections must be applied algebraically, the direction of turning the shaft depends on the sign of $p$.

A brief review of the operation will now be given. At the beginning of the first interval the several integrators are set to the proper values taken from the tabulation of the function and its successive differences. This initial setting is accomplished by the setting shafts 23 while the clutches 28, 36 and 40 are open. The clutches are then closed and the argument shaft 6 is rotated through one interval. The counters 50 and 52 are then read and compared with the tabulated values of the second difference and of the function, respectively. The new fourth order difference value is introduced by the setting shaft 23 of the fourth integrator. The carriage of the second integrator is brought to its tabulated value by turning its setting shaft 23 until the counter 50 reads the proper second order difference value for the beginning of the second interval. The value of $p$ having been computed from the reading of the output counter 52, all of the brakes are now set and the correction shaft 66 is rotated a distance corresponding to the value of $p$, care being taken to have the clutch 110 set properly, depending on the direction of change of the argument. The offsets are thus simultaneously applied to the carriages of the first three integrators. The brakes are then released and the next interval is integrated by rotating the argument shaft. This procedure is repeated at the beginning of each new interval.

It is to be emphasized that the deviations measured at any particular time are extremely small. Thus in the numerical example given by way of illustration herein the deviations would be expected to affect only the last significant figure. Although deviations necessarily appear from a variety of causes, the purpose of the correction procedure is to remove their effects from subsequent intervals and thus to prevent accumulations of error. These results are produced without introducing any discontinuities into the function, although discontinuities of negligible magnitude will appear in its derivatives because of the correction offsets applied to the integrators.

Conclusion

From the preceding description it will be seen that the difficulty of the problem which is solved by the present invention arises from the fact that numerical data are always presented in the form of a step function. Data of experimental origin are necessarily in discontinuous or step form. This is equally true of numerical data computed from a function which is expressed analytically. For example, while the function $e^x$ is continuous, the process of computing and tabulating numerical values necessarily reduces the data to a step function. The function taken by way of example in this specification is, so far as the tabulated numerical values are concerned, a step function even though the original function represented by these numerical values is continuous.

In any case, the present invention operates on numerical data expressed in step form and utilizes such data to operate a mechanical device (e. g. a curve-drawing instrument) in a continuous fashion, and in accordance with a continuous function represented by the given numerical data. It will be understood that the output of the first integrator A (which is actually the final integrator, so far as the cascade integration is concerned) may be transmitted through the lead screw 60 or any suitable connection to a machine tool, control device, or to any apparatus which is to be operated in continuous fashion in accordance with the generated function.

It has been found that the accuracy of the system considerably exceeds any demands which would normally be placed upon it. Although the analysis is based on an approximation due to the assumption of equivalency between difference values and derivatives, this approximation is of extremely high order. Furthermore, the correcting mechanism not only compensates for the mathematical approximation, but also eliminates any appreciable errors due to the operation of the mechanical devices themselves. Errors due to backlash, slippage, etc., may be considered as completely eliminated, at least for all practical purposes. Comparisons with test functions have indicated a residual error between the generated and given functions as small as one part in 200,000.

Having thus described the invention, we claim:

1. Apparatus for generating a motion in a smooth continuous path in accordance with given data expressed as a step function, comprising a series of integrators; each integrator having operating means, output means operable in response to the operating means, and adjustable means for varying the response of the output means to the operating means; connections from the output means for each integrator, except the first, to the adjustable means of the next preceding integrator; means for setting the adjustable means of the last integrator in accordance with higher-order difference values of the given function; and an output device connected with the output of the first integrator and movable thereby in a smooth continuous path.

2. Apparatus for generating a motion in a smooth continuous path in accordance with given data expressed as a step function, comprising a series of integrators; each integrator having driving means, output means movable in response to the driving means, and variable multiplier means for varying the response of the output means to the driving means; connections from the output means of each integrator, except the first, to the next preceding integrator to operate the variable multiplier means thereof; means for operating the multiplier means of the last integrator in accordance with higher-order difference values of the given function; means for setting the multiplier means of the preceding integrators in accordance with the constants of integration of the integrated function; and an output device connected with the output of the first integrator and movable thereby in a smooth continuous path.

3. Apparatus for generating a motion in a smooth continuous path in accordance with given data expressed as a step function, comprising a series of integrators; each integrator having operating means, output means operable in response to the operating means, and adjustable means for varying the response of the output means to the operating means; connections from the output means of each integrator, except the first, to the adjustable means of the next preceding integrator; means for setting the adjustable means of the last integrator in accordance with higher-order difference values of the given function; an output device connected with the output of the first integrator and movable thereby in a smooth continuous path; and offsetting means for operating at intervals the adjustable means of selected integrators to introduce corrective settings in accordance with deviations between the generated output and the given function.

4. Apparatus for generating a motion in a smooth continuous path in accordance with given data expressed as a step function, comprising a series of integrators; each integrator having driving means, output means movable in response to the driving means, and variable multiplier means for varying the response of the output means to the driving means; connections from the output means of each integrator, except the first, to the next preceding integrator to operate the variable multiplier means thereof; means for operating the multiplier means of the last integrator in accordance with higher-order difference values of the given function; means for setting the multiplier means of the preceding integrators in accordance with the constants of integration of the integrated function; an output device connected with the output of the first integrator and movable thereby in a smooth continuous path; and offsetting means for operating at intervals the multiplier means of selected integrators to introduce corrective settings in accordance with deviations between the generated output and the given function.

5. Apparatus for generating a motion in a smooth continuous path in accordance with given data expressed as a step function, comprising a series of integrators; each integrator comprising argument input means, function input means, and output means operable in response to both of said input means; connections from the output means of each integrator, except the first, to the function input means of the next preceding integrator; means for setting the function input means of the last integrator in accordance with higher-order difference values of the given function; and an output device connected with the output of the first integrator and movable thereby in a smooth continuous path.

6. Apparatus for generating a motion in a smooth continuous path in accordance with given data expressed as a step function, comprising a series of integrators; each integrator comprising argument input means, function input means, and output means operable in response to both of said input means; connections from the output means of each integrator, except the first, to the function input means of the next preceding integrator; means for setting the function input means of the last integrator in accordance with higher-order difference values of the given function; an output device connected with the output of the first integrator and movable thereby in a smooth continuous path; and offsetting means for operating at intervals the function input means of selected integrators to introduce corrective settings in accordance with deviations between the generated output and the given function.

7. Apparatus for generating a motion in a smooth continuous path in accordance with given data expressed as a step function, comprising a series of integrators; each integrator having argument input means operable in accordance with any argument $\alpha$, function input means operable in accordance with a function $s$, and output means operable in response to both said input means in accordance with $\int s d\alpha$; connections from the output means of each integrator, except the first, to the function input means of the next preceding integrator; means for setting the function input means of the last integrator in accordance with higher-order difference values of the given function; and an output device connected with the output of the first integrator and movable thereby in a smooth continuous path.

8. Apparatus for generating a motion in a smooth continuous path in accordance with given data expressed as a step function, comprising a series of integrators; each integrator having argument input means operable in accordance with any argument $\alpha$, function input means operable in accordance with a function $s$, and output means operable in response to both said input means in accordance with $\int s d\alpha$; connections from the output means of each integrator, except the first, to the function input means of the next preceding integrator; means for setting the function input means of the last integrator in accordance with higher-order difference values of the given function; an output device connected with the output of the first integrator and movable thereby in a smooth continuous path; and offsetting means for operating at intervals the function input means of selected integrators to introduce corrective settings in accordance with deviations between the generated output and the given function.

VANNEVAR BUSH.
SAMUEL H. CALDWELL.